United States Patent
Taubmann et al.

(10) Patent No.: US 7,156,463 B2
(45) Date of Patent: Jan. 2, 2007

(54) MOTOR VEHICLE SEAT

(75) Inventors: Werner Taubmann, Lauteral (DE); Thomas Hein, Ahorn (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/487,539

(22) PCT Filed: Aug. 30, 2002

(86) PCT No.: PCT/DE02/03268

§ 371 (c)(1), (2), (4) Date: Feb. 24, 2004

(87) PCT Pub. No.: WO03/018349

PCT Pub. Date: Mar. 6, 2003

(65) Prior Publication Data

US 2004/0232752 A1  Nov. 25, 2004

(30) Foreign Application Priority Data

Aug. 31, 2001 (DE) ............................... 101 43 721

(51) Int. Cl.
*B60N 2/02* (2006.01)

(52) U.S. Cl. .................... 297/378.12; 297/378.1; 297/344.1; 297/340; 297/341

(58) Field of Classification Search ........... 297/378.12, 297/378.1, 378.14, 354.1, 344.1, 340, 341; 296/65.03, 65.13, 65.09; 248/430, 429
See application file for complete search history.

(56) References Cited

U.S. PATENT DOCUMENTS

| | | | |
|---|---|---|---|
| 3,957,312 A * | 5/1976 | Bonnaud | 297/341 |
| 4,671,571 A * | 6/1987 | Gionet | 291/341 |
| 4,717,204 A * | 1/1988 | Tezuka | 297/362 |
| 4,973,104 A | 11/1990 | Nakayama et al. | |
| 5,269,588 A * | 12/1993 | Kunz et al. | 297/322 |
| 5,482,345 A * | 1/1996 | Bolsworth et al. | 296/65.03 |
| 5,531,503 A * | 7/1996 | Hughes | 297/341 |
| 5,597,206 A | 1/1997 | Ainsworth et al. | |
| 5,695,247 A * | 12/1997 | Premji | 297/341 |
| 5,717,300 A * | 2/1998 | Baloche et al. | 318/282 |

(Continued)

FOREIGN PATENT DOCUMENTS

CA    2097776    12/1994

(Continued)

OTHER PUBLICATIONS

International Search Report for PCT/DE02/03268, dated Dec. 30, 2002.

(Continued)

*Primary Examiner*—Peter M. Cuomo
*Assistant Examiner*—Erika Garrett
(74) *Attorney, Agent, or Firm*—Christie, Parker & Hale LLP

(57) ABSTRACT

A motor vehicle seat has a pivoted backrest that can be swung forward in the direction of a seating of the seat, a longitudinal seat adjuster for adjusting the longitudinal position of the seat, a locking device of the longitudinal seat adjuster for locking a longitudinal seat position previously adjusted, and an unlocking mechanism for unlocking the locking device, and a flexible traction device via which the unlocking mechanism is coupled with the backrest so that the locking device is unlocked when the backrest is swung forward. An actuation element acts upon the traction device with a force component at an angle to the direction of extension of the traction device when the backrest is swung forward, thereby tightening the traction device and unlocking the locking device.

24 Claims, 3 Drawing Sheets

U.S. PATENT DOCUMENTS

| | | | | |
|---|---|---|---|---|
| 5,718,477 | A * | 2/1998 | Schuler | 297/341 |
| 5,873,629 | A * | 2/1999 | Schuler | 297/341 |
| 6,030,042 | A * | 2/2000 | Bauer et al. | 297/341 |
| 6,048,030 | A * | 4/2000 | Kanda et al. | 297/341 |
| 6,152,533 | A * | 11/2000 | Smuk | 297/341 |
| 6,158,800 | A * | 12/2000 | Tsuge et al. | 296/65.09 |
| 6,220,665 | B1 * | 4/2001 | Dingel et al. | 297/326 |
| 6,234,575 | B1 * | 5/2001 | Schuler et al. | 297/344.1 |
| 6,254,188 | B1 * | 7/2001 | Downey | 297/341 |
| 6,513,875 | B1 * | 2/2003 | Gray et al. | 297/378.14 |
| 6,520,581 | B1 * | 2/2003 | Tame | 297/336 |
| 6,631,952 | B1 * | 10/2003 | Liebetrau et al. | 297/341 |
| 6,736,460 | B1 * | 5/2004 | Becker et al. | 297/378.12 |

FOREIGN PATENT DOCUMENTS

| | | |
|---|---|---|
| DE | 36 08 827 A1 | 10/1987 |
| WO | WO 99/41102 | 8/1999 |
| WO | WO 00/55002 | 9/2000 |

OTHER PUBLICATIONS

International Preliminary Examination Report of PCT/DE02/03268, dated Jul. 24, 2003.
English translation of International Preliminary Examination Report dated Jul. 24, 2003 for PCT/DE02/03268.

* cited by examiner

MOTOR VEHICLE SEAT

CROSS-REFERENCE TO RELATED APPLICATION(S)

This application is a National Phase Patent Application of International Application Number PCT/DE02/03268, filed on Aug. 30, 2002, which claims priority of German Patent Application Number 101 43 721.8, filed on Aug. 31, 2001.

BACKGROUND

A vehicle seat comprises a pivotally mounted backrest which can be folded forwards towards the seat surface of the seat, a seat longitudinal adjuster with which the longitudinal position of the seat (position in the vehicle longitudinal direction) can be adjusted, a fixing device for the seat longitudinal adjustment with which a previously set seat longitudinal position can be locked, a release mechanism with which the fixing device can be released in order to be able to set a different seat longitudinal position, as well as a flexible traction means through which the release mechanism is coupled to the backrest so that the fixing device is released when folding the backrest towards the seat surface.

With a vehicle seat of this kind, the fixing device can be released by folding the backrest forwards towards the seat surface so that the seat can be moved forwards to facilitate passengers entering the back of the vehicle. An "easy-entry mechanism" of this kind is widely used in the case of two-door vehicles.

However a problem exists in that many users find that the amount of force required to fold the backrest forwards is too high. In particular, a considerable force is necessary to release the seat longitudinal adjuster since, as a rule, its locking mechanism is pretensioned for safety reasons towards the locked state by elastic elements.

The object of the invention is to improve a vehicle seat of this kind regarding operating comfort.

SUMMARY

When the backrest is folded forward, an operating element acts on the traction means with a force component transverse to the extension direction of the traction means so that the traction means are tightened and the fixing device is released. The action of the actuating element on the traction means thereby unfolds so that the actuating element is moved with a component perpendicular to the extension direction of the traction means and is thereby in contact with the traction means. In a further embodiment, the actuating element presses against the traction means from above.

As opposed to known mechanism for releasing the seat longitudinal adjuster by folding the backrest forwards, here in order to tighten the traction means through which the release is to be actuated, the force is not exerted in the extension direction of the traction means on one end of the traction means, rather it is exerted having a component across the extension direction of the traction means on a section of the traction means. The resulting force need thereby not be aligned exactly perpendicular to the extension direction of the traction means as corresponds to one embodiment. It is sufficient if the force exerted by the actuating element on the traction means has at least a force component transverse to the extension direction of the traction means.

With this, when compared with arrangements known from the prior art a reduction of the force necessary to be applied by folding the backrest forwards is achieved by utilizing the advantage present with a block and tackle.

Furthermore, with the arrangement according to an embodiment of the invention, the traction means can be completely pre-fitted on the seat lower frame given that no connection is required between the traction means and backrest. In this manner the backrest can act through the actuating element on the traction means fixed on the lower frame.

The actuating element preferably acts on a section of the traction means which is spaced from the backrest-end of the traction means.

The actuating element is advantageously formed rotationally symmetrical relative to an axis and is mounted rotatable about this axis. In an exemplary embodiment of the present invention, a roller is used as an actuating element. In alternative embodiments, in the case of a vehicle seat, elements which are provided for other purposes, such as e.g. an axle shaft of a seat axle can also be used as actuating elements. In a further embodiment, the actuating element can also be formed through a slider which consisting of plastics.

Several actuating elements may also be provided for acting on the traction means for the best possible reduction of the force to be applied. These actuating elements act on the traction means similar to a block and tack having several loose rollers.

The traction means itself is fixed by its backrest end at a suitable fixing point on the seat frame, e.g. on a seat side part. The fixing point is selected so that when the backrest is folded forwards the fixing point is not moved; more particularly it is not pivoted together with the backrest.

In a further embodiment of the invention, a guide element is provided to guide the traction means so that a section of the traction means runs at a suitable angle, more particularly perpendicular to the active direction of the actuating element. This guide element is preferably formed by a roller (which may be a fixed roller) which interacts with the actuating element provided for acting on the traction means for obtaining the block and tackle effect.

The actuating element can be readily arranged so that when the backrest is folded forwards by pivoting, it can be brought into engagement with the traction means. For this the actuating element is mounted on a body which is movable, more particularly pivotal, when the backrest is folded forwards.

In a further embodiment, the backrest acts with a follower on a stop associated with the actuating element when folding forwards in order to bring the actuating element into engagement with the traction means. The follower and stop are thereby positioned so that the release process only starts after folding the backrest forwards about a certain minimum amount.

Further features and advantages of the invention will be apparent from the following description of an embodiment with reference to the drawings.

DETAILED DESCRIPTION

Figure 3:
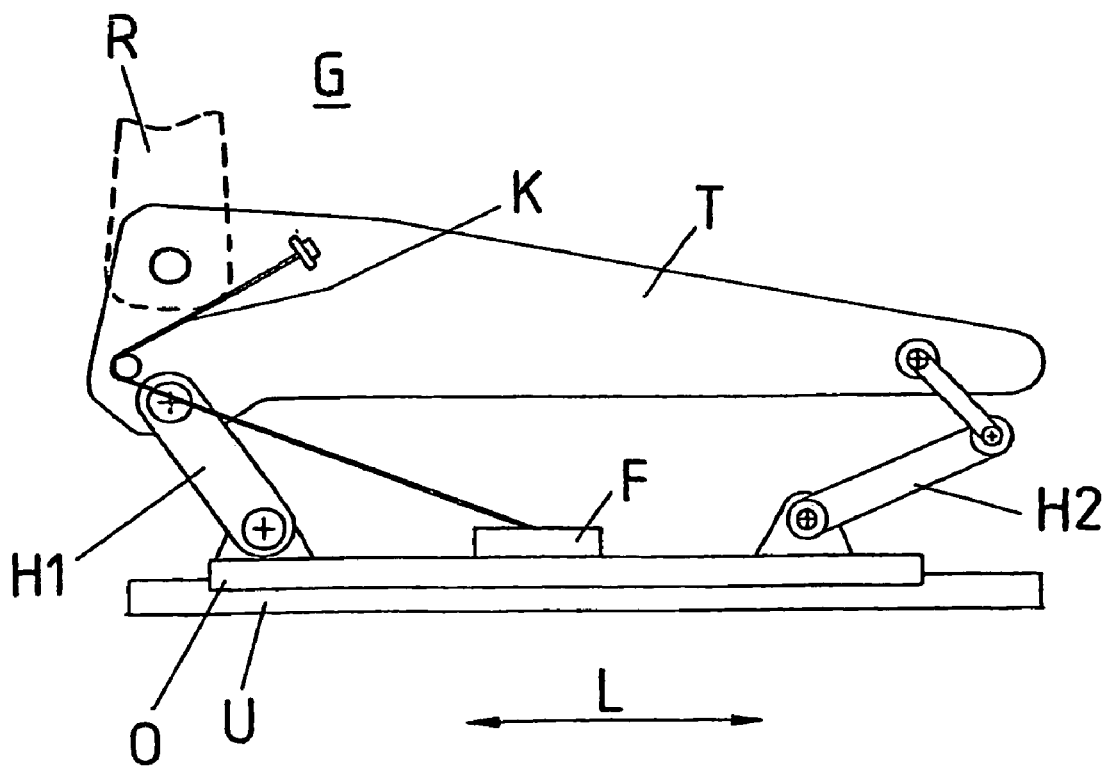
FIG. 3 shows a diagrammatic view of a motor vehicle seat.

FIG. 3 shows diagrammatically a frame G of a motor vehicle seat having a seat side part T which is connected through a lever pair H1 and H2 vertically adjustable to the top rail O of a rail longitudinal guide. The rail longitudinal guide consists of two rails O, U displaceable relative to each other in the longitudinal direction L and serve to hold a seat trough having a seat cushion. The rail longitudinal guide is lockable by means of a fixing device F so that the seat longitudinal position actually set is fixed. For safety reasons, the fixing device F is normally pretensioned towards its locked state by means of elastic elements so that the seat longitudinal position is constantly fixed unless the locking of the fixing device F is actively released against the action of the elastic element.

A backrest frame R of a seat back is pivotably attached to the seat side part T, and can pivot in a useful region in order to set the backrest incline corresponding to the requirements of the relevant seat user. The backrest frame R can be folded forwards towards the seat surface (or seat cushion) in order to release the fixing device F and slide the seat, with the backrest folded forwards (this is known as an easy-entry function). For this, the backrest frame R is coupled to the fixing device F, which will be described with reference to FIGS. 1 and 2, through a coupling mechanism K (diagrammatically shown in FIG. 3).

An easy-entry mechanism of the type described with reference to FIG. 3 is known from, for example, WO 00/55002 (apart from the novel action according to the invention of the backrest with R on the coupling mechanism K which will be described with reference to FIGS. 1 and 2). As such, details regarding the design of this mechanism will not be described. Instead, in this respect reference is made to the WO 00/55002A1.

Figure 1:
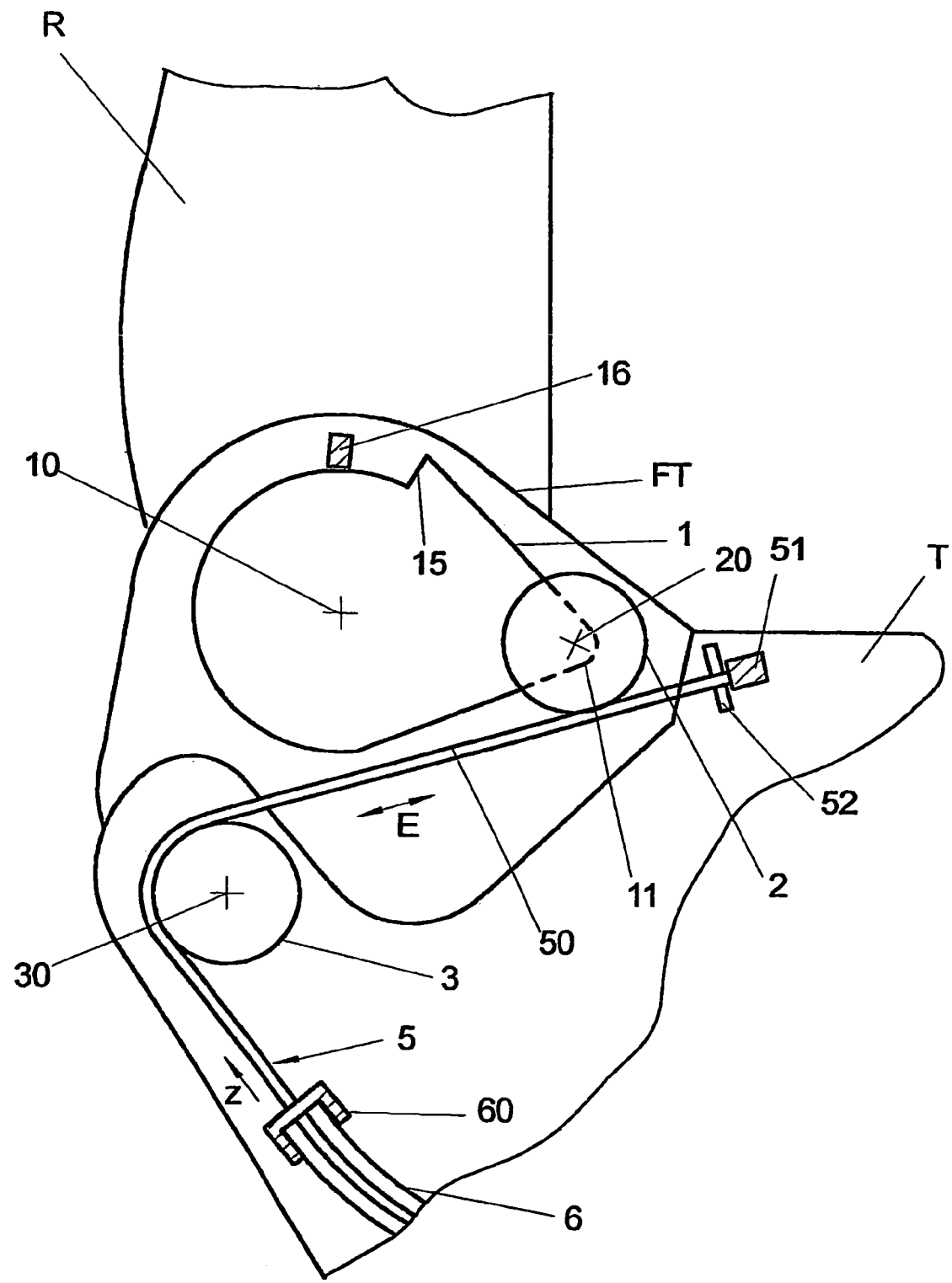
FIG. 1 shows an arrangement in which a backrest raised up substantially vertical, when folded forwards to release the fixing device of a seat longitudinal adjuster, acts on a traction means.

FIG. 1 shows a part of the backrest R of the vehicle seat according to FIG. 3 which is pivotably attached to a projection FT of a seat side part T of the vehicle seat. The backrest R can be set in different useful positions by pivoting about its swivel axis to support the back of the occupant. The backrest can also be folded forwards towards the seat surface in order to release the easy-entry mechanism explained with reference to FIG. 3.

In FIG. 1, the backrest R is located in a useful position in which it is set substantially perpendicular.

On the protection FT of the seat side part T on which the backrest R is mounted for swivel movement, body a 1 comprising a cam is mounted to pivot what the backrest R about an axis 10. The pivotal body 1 has a stop 15 associated with a follower 16 which is pivoted clockwise together with the backrest when the backrest R is folded forwards towards the seat surface. In this manner the follower 16 moves into engagement with the stop 15 so that on folding the backrest R further forward, the pivotal body 1 is entrained by the follower 16 through the stop 15, and is pivoted about its axis 10.

A roller 2 is mounted rotatable about an axis 20 on a lug 11 of the pivotal body 1. Underneath the roller 2, a section 50 of a traction means 5 (which in the exemplary embodiment shown comprise a cable) is guided. The traction means 5 serves to couple the backrest R to the fixing device of a seat longitudinal adjuster. By tightening the traction means 5, the fixing device can be released. The traction means 5 is connected by one end to the fixing device. The other end 51 (backrest side end) of the traction means 5 comprises a nipple, and is suspended through a stop 52 from the seat side part T. The traction means 5 extends by its section 50 beneath the pivotal body 1 to a roller 3 (fixed roller) rotatably mounted on the seat side part about an axis 30. The roller 3 serves as a guide element. Using the roller 3, the traction means is guided towards the fixing device to be actuated. The traction means is guided in a Bowden sleeve 6 along the connecting path from the roller 3 to the fixing device to be actuated. The Bowden sleeve is supported on a support element 60 provided on the seat side part T.

Figure 2:
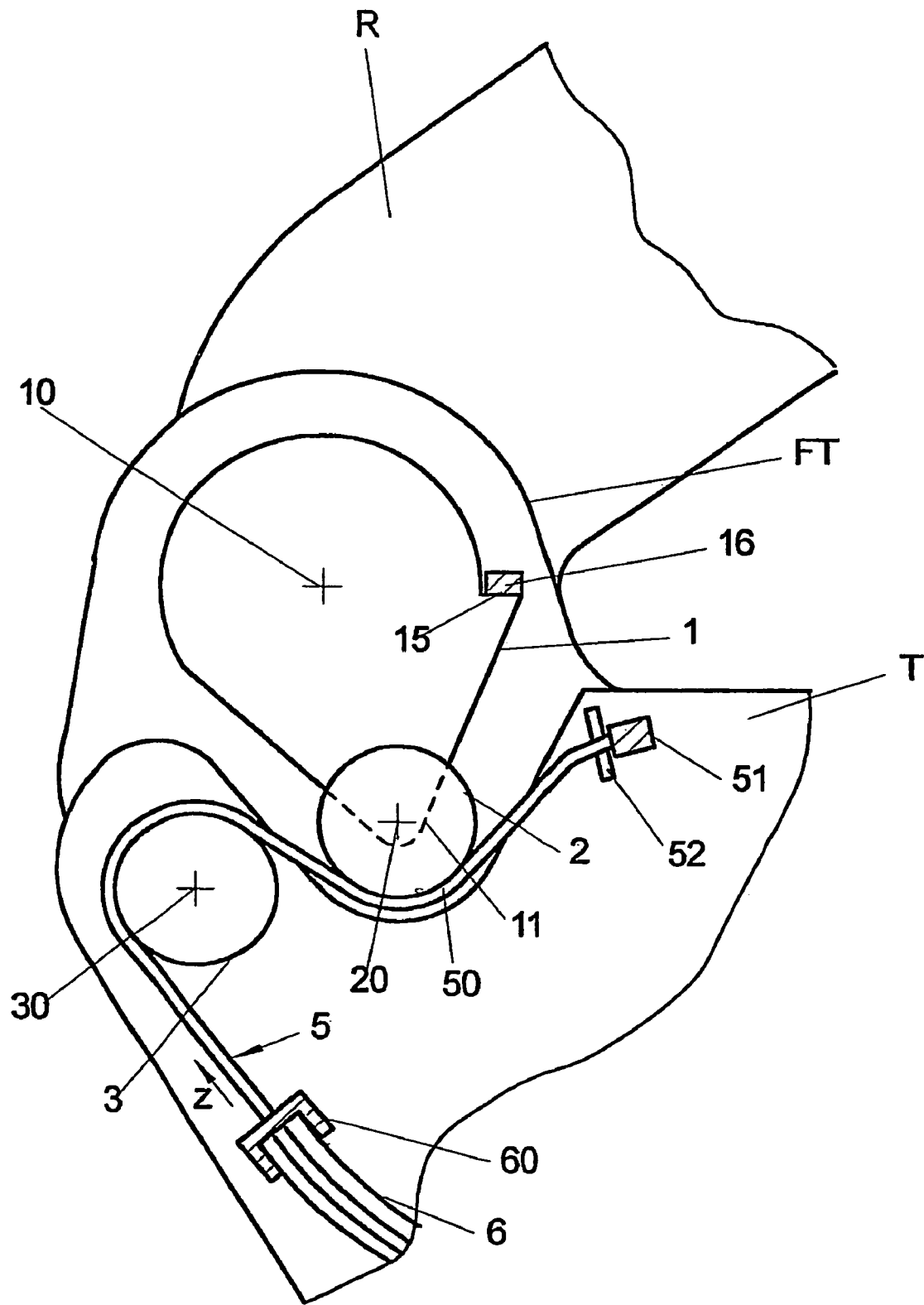
FIG. 2 shows the arrangement of FIG. 1 in which the backrest is folded forwards towards the seat surface.

The arrangement illustrated in FIG. 2 shows the backrest R of FIG. 1 folded forwards from its substantially perpendicular position towards the sitting surface of the seat.

On folding the backrest R forwards the follower 16, which is connected in suitable manner to the backrest R and at first is spaced from the stop 15 of the pivotal body 1, is moved (clockwise) and thereby strikes the stop 15 after a certain pivotal angle. Only at this point does a swivel movement of the body 1 start which is entrained by the follower 16 and the associated stop 15 and is thus pivoted together with the backrest R. The pivotal body 1 can be pretensioned by means of an elastic element (not shown) in the direction of its position illustrated in FIG. 1 (in which it does not act on the traction means 5). In this manner, the pivotal body 1 would be entrained by the follower 16 against this pretensioning force if the backrest is folded forwards and thereby act on a section 50 of the traction means 5.

When swiveling the body 1 clockwise (corresponding to folding the backrest R forwards) its nose 11 is moved with the roller 2 mounted rotatable thereon towards the section 50 of the flexible traction means extending underneath the body 1. The roller 2 thereby acts with a force component running perpendicular to the extension direction of the said section 50 of the traction means 5 onto the section 50 of the traction means 5. The traction means 5 is thereby guided in suitable guide channels of the rollers 2 and 3. In addition, further guide means may also be provided on the seat side part in order to guide the section 50 of the traction means 5 running underneath the rotary mounted roller 2 along a defined path so that the roller may act thereon.

In this manner, the said section 50 of the traction means 5 is curved and the traction means tightened overall. A force thus acts on the part of the traction means 5 guided in the Bowden sleeve 6 along a traction direction Z towards the cable roller 3 serving to deflect the traction means 5 (and thus away from the fixing device of the seat longitudinal adjuster). As known in the prior art, the fixing device of the seat longitudinal adjuster may thus be released by the locking elements of the fixing device being lifted from their locking position against the action of elastic elements.

As opposed to the arrangements known from the prior art, to tighten the traction means 5 in an exemplary embodiment of the present invention, no force is exerted on the backrest side end 51 of the traction means 5 in the extension direction of the corresponding section 50 of the traction means 5. The backrest side end 51 of the traction means 5 is rather fixed spatially and is not moved when folding the backrest forwards. Instead of this, an action of an actuating element on a section 50 of the traction means takes place perpendicular to its extension direction through which this section is curved. This has the result of tightening the traction means 5 (corresponding to a shortening of the effective length of the traction means) through which the fixing device of the seat longitudinal adjuster can be released. In order to slide the traction means 5 with its section guided in the Bowden sleeve 6 about a certain amount in the traction direction Z sufficient to release the fixing device, there is need for a larger adjusting path of the roller 2 acting on the traction means 5 compared with an actuating element which acts with a tractive force directly on the backrest side end 51 of the traction means 5. Since the work to be applied to overcome the pretensioning force of the elastic elements of the fixing device is the same in both cases, this has the result that it is not necessary to apply as large a force with the embodiments of the present invention shown as compared to the prior art.

The invention claimed is:

1. A motor vehicle seat comprising:
   a swivel mounted backrest foldable forwards towards a seat surface of the seat;
   a seat longitudinal adjuster for setting a longitudinal position of the seat;
   a fixing device for the seat longitudinal adjuster for locking a previously set seat longitudinal position;
   a release mechanism for releasing the fixing device;
   a flexible traction device for coupling the release mechanism to the backrest so that the fixing device is released when the backrest is folded forwards;
   a body which is movable when the backrest is folded forwards;
   an actuating element mounted to the body; and
   a follower being moveable with the backrest;
   wherein the traction device is fixed by an end area on a backrest side to a fixing point which is not moved when the backrest is folded forwards;
   wherein when folding the backrest forwards, the backrest acts with the follower on a stoop of the body such that the actuating element is brought into engagement with the traction device; and
   wherein the actuating element acts on the traction device with a force component transverse to an extension direction of the traction device so that the fixing device is released.

2. A motor vehicle seat according to claim 1, wherein the actuating element acts on a section of the traction device which is spaced from the end area on the backrest side of the traction device.

3. A motor vehicle seat according to claim 1 or 2, wherein the actuating element is rotationally symmetrical.

4. A motor vehicle seat according to claim 3, wherein the actuating element is formed by a roller.

5. A motor vehicle seat according to claim 3, wherein the actuating element is formed by a section of an axis.

6. A motor vehicle seat according to claim 1, wherein the actuating element is mounted rotatable.

7. A motor vehicle seat according to claim 1, wherein the actuating element is formed by seat components which have another function other than acting on the traction device.

8. A motor vehicle seat according to claim 1, wherein the actuating element is formed by a slider.

9. A motor vehicle seat according to claim 8, wherein the actuating element is formed by a slider made of plastics.

10. A motor vehicle seat according to claim 1, wherein when folding the backrest forwards at least two actuating elements act on the traction device.

11. A motor vehicle seat according to claim 1, wherein the traction device is fixed in a region of the end of the traction device nearest the backrest on a fixing point on a seat frame of the motor vehicle seat.

12. A motor vehicle seat according to claim 11, wherein the fixing point is not pivoted when the backrest is folded forwards.

13. A motor vehicle seat according to claim 1, wherein a guide element is provided with which the traction device is deflected so that a section of the traction device runs at an angle.

14. A motor vehicle seat according to claim 1, wherein the actuating element is moved when folding the backrest forwards.

15. A motor vehicle seat according to claim 14, wherein the body can swivel when folding the backrest forwards.

16. A motor vehicle seat according to claim 15, wherein the stop is provided on the body which can swivel.

17. A motor vehicle seat according to claim 14, wherein the actuating element is swivelled so that it engages with the traction device when folding the backrest forwards.

18. A motor vehicle seat according to claim 1, wherein the follower engages the stop only after the backrest has been folded forwards from a useful position after a defined angle.

19. A motor vehicle seat according to claim 1, wherein a guide is provided to guide the traction device in the region of the actuating element.

20. A motor vehicle seat according to one of claims 1 or 18, wherein the stop is provided on the body which can swivel when folding the backrest forwards.

21. A motor vehicle seat comprising:
   a swivel mounted backrest foldable forwards towards a seat surface of the seat;
   a seat longitudinal adjuster for setting a longitudinal position of the seat;
   a fixing device for the seat longitudinal adjuster for locking a previously set seat longitudinal position;
   a release mechanism for releasing the fixing device;
   a flexible traction device for coupling the release mechanism to the backrest so that the fixing device is released when the backrest is folded forwards;
   wherein the traction device is fixed by an end area on a backrest side to a fixing point which is not moved when the backrest is folded forwards, and wherein when folding the backrest forwards an actuating element acts on the traction device with a force component transverse to an extension direction of the traction device so that the fixing device is released; and
   wherein a guide element is provided with which the traction device is deflected so that a section of the traction device runs at an angle perpendicular to the active direction of the actuating element.

22. A motor vehicle seat according to claim 21, further comprising a body moveable when the backrest is folded forwards, wherein when folding the backrest forwards, the backrest acts by a follower on a stop of the body such that the actuating element is brought into engagement with the traction device.

23. A motor vehicle seat comprising:
   a swivel mounted backrest foldable forwards towards a seat surface of the seat;
   a seat longitudinal adjuster for setting a longitudinal position of the seat;
   a fixing device for the seat longitudinal adjuster for locking a previously set seat longitudinal position;
   a release mechanism for releasing the fixing device;
   a flexible traction device through which the release mechanism is coupled to the backrest so that the fixing device is released when the backrest is folded forwards;
   a body which is movable when the backrest is folded forwards;
   an actuating element mounted to the body; and
   a follower being movable with the backrest;
   wherein the traction device is fixed by an end area on a backrest side to a fixing point which is not moved when the backrest is folded forwards;

wherein when folding the backrest forwards, the backrest acts with the follower on a stop of the body such that the actuating element is brought into engagement with the traction device; and wherein the actuating element acts on the traction device with a force component transverse to an extension direction of the traction device so that the fixing device is released.

24. A motor vehicle seat comprising:

a swivel mounted backrest foldable forwards towards a seat surface of the seat;

a seat longitudinal adjuster for setting a longitudinal position of the seat;

a fixing device for the seat longitudinal adjuster for locking a previously set seat longitudinal position;

a release mechanism for releasing the fixing device;

a flexible traction device having an extension direction and an end area on a backrest side, the flexible traction device being adapted for coupling the release mechanism to the backrest so that the fixing device is released when the backrest is folded forwards;

wherein the traction device is fixed by the end area on a backrest side to a fixing point situated in a position on the seat which is not moved when the backrest is folded forwards, and wherein when folding the backrest forwards an actuating element acts on the traction device with a force component transverse to the extension direction of the traction device so that the fixing device is released; and wherein a guide element is provided with which the traction device is deflected so that a section of the traction device runs at an angle perpendicular to the active direction of the actuating element.

* * * * *

UNITED STATES PATENT AND TRADEMARK OFFICE
CERTIFICATE OF CORRECTION

PATENT NO.         : 7,156,463 B2                                   Page 1 of 1
APPLICATION NO. : 10/487539
DATED              : January 2, 2007
INVENTOR(S)        : Taubmann et al.

It is certified that error appears in the above-identified patent and that said Letters Patent is hereby corrected as shown below:

In the Claims

Column 5, line 28, Claim 1           Delete "stoop",
                                     Insert --stop--

Column 6, line 13, Claim 18          Delete "after",
                                     Insert --about--

Signed and Sealed this

Fifteenth Day of April, 2008

JON W. DUDAS
*Director of the United States Patent and Trademark Office*